US010723943B2

United States Patent
Bumpus et al.

(10) Patent No.: US 10,723,943 B2
(45) Date of Patent: Jul. 28, 2020

(54) FLAME RETARDANT IDENTIFICATION SYSTEM

(71) Applicant: Junius, LLC, Auburn, NY (US)

(72) Inventors: Patrick D. Bumpus, Auburn, NY (US); George S. Murray, Auburn, NY (US)

(73) Assignee: Junius, LLC, Auburn, NY (US)

( * ) Notice: Subject to any disclaimer, the term of this patent is extended or adjusted under 35 U.S.C. 154(b) by 251 days.

(21) Appl. No.: 15/838,897

(22) Filed: Dec. 12, 2017

(65) Prior Publication Data

US 2018/0100099 A1     Apr. 12, 2018

Related U.S. Application Data

(62) Division of application No. 14/308,365, filed on Jun. 18, 2014, now abandoned.

(60) Provisional application No. 61/836,289, filed on Jun. 18, 2013.

(51) Int. Cl.
    *C09K 11/06*     (2006.01)
    *C09K 11/02*     (2006.01)

(52) U.S. Cl.
    CPC ............ *C09K 11/025* (2013.01); *C09K 11/06* (2013.01); *C09K 2211/14* (2013.01); *Y10T 428/2481* (2015.01); *Y10T 428/24802* (2015.01)

(58) Field of Classification Search
    CPC ... C09K 11/06; C09K 11/025; C09K 2211/14; C09K 2211/00; Y10T 428/24802; Y10T 428/2481; Y10T 428/24612
See application file for complete search history.

(56) References Cited

U.S. PATENT DOCUMENTS

| | | | | |
|---|---|---|---|---|
| 5,293,648 A | * | 3/1994 | Finley | D06P 1/004 116/206 |
| 6,620,349 B1 | * | 9/2003 | Lopez | B27K 3/15 252/378 R |
| 7,707,406 B2 | * | 4/2010 | Qiu | G06F 21/33 713/155 |
| 2010/0092948 A1 | * | 4/2010 | Davis | C12Q 1/6813 435/5 |
| 2011/0114734 A1 | * | 5/2011 | Tiedmann | G06K 19/041 235/492 |
| 2012/0146784 A1 | * | 6/2012 | Hines | A41D 13/1281 340/539.11 |
| 2012/0213982 A1 | * | 8/2012 | Meyer | C08K 5/49 428/219 |
| 2014/0248434 A1 | * | 9/2014 | Khadbai | C09D 5/18 427/307 |

\* cited by examiner

*Primary Examiner* — Gregory J Toatley, Jr.
*Assistant Examiner* — Lynda Dinh
(74) *Attorney, Agent, or Firm* — Bond, Schoeneck & King, PLLC; Frederick Price

(57) ABSTRACT

The present invention relates to a flame retardant identification system and, more particularly, to a tracing and tagging agent including a fluorescent tracing compound for substrates such as textiles and lumber.

5 Claims, 9 Drawing Sheets

Fig. 2 textile substrate stamped with a tracing and tagging agent of FIG.1 and shown under ambient light conditions Fig. 3 textile substrate stamped with a tracing and tagging agent of FIG. 1 and shown under ultraviolet light after washing Fig. 5 lumber substrate treated with flame retardant paint and stamped with a tracing and tagging agent of FIG. 4 and shown under ambient light conditions

| | |
|---|---|
| Application Number | 1 |
| Date of Treatment | 5/16/2013 |
| Person or Company to Recieve Certification | National University |
| Street Address | 1000 Main Street |
| City | New York |
| State | NY |
| Zip Code | 10010 |
| Type and Description of Materials Treated | |
| Location of Treated Substrate | |
| Amount of Inspect-Shield Used | |
| Batch Date Code | |
| Name of Applicating Person or Firm | |
| Address | |

FLAME RETARDANT IDENTIFICATION SYSTEM

RELATED APPLICATION DATA

The present application claims priority to and the benefit of U.S. patent application Ser. No. 14/308,365, filed Jun. 18, 2014, which claims priority to and the benefit of U.S. provisional patent application No. 61/836,289, filed Jun. 18, 2013, each of which is hereby incorporated by reference in its respective entireties.

BACKGROUND OF THE INVENTION

1. Field of the Invention

The present invention relates to a flame retardant identification system and, more particularly, to a tracing and tagging agent including a fluorescent tracing compound for substrates such as textiles and lumber.

2. Description of the Related Art

In the fire retardant industry, textiles and lumber substrates that are required to meet flammability codes have a separate physical tag affixed to them to allow code enforcement officials to determine if the item meets a listed flammability standard. This is the conventional method used for identification in the industry.

Often times these tags fall off or are removed and there is no longer proof for code enforcement officials or the owner of the items that the items were treated to meet code or still comply with the code requirements. Further, these tags can be unsightly when used in areas that visual aesthetics are important.

Additionally, flame retardant treated textiles that are laundered lose their flame retardancy, and any tags that may still be attached present the misconception that the item still meets code.

Description of the Related Art Section Disclaimer: To the extent that specific patents/publications/products are discussed above in this Description of the Related Art Section or elsewhere in this Application, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

SUMMARY OF THE INVENTION

Various embodiments of the present invention may be advantageous in that they may solve or reduce one or more of the potential problems and/or disadvantages discussed above.

Various embodiments of the present invention may exhibit one or more of the following objects, features and/or advantages:

It is a principal object and advantage of the present invention to provide a tagging and tracking agent/system to monitor textiles and lumber substrates treated with certain flame retardant products.

In accordance with the foregoing objects and advantages, an embodiment of the present invention is directed to a tagging and tracking system including one or more of the following: a tracing and tagging agent for textiles treated with a flame retardant composition, the agent comprising a clear aqueous fluorescent compound. The agent is formulated in such a manner that is not visible under normal lighting conditions. The compound can be comprised of a (YFP) yellow organic protein fluorophore suspended in Dihydrogen Monoxide.

The "invisible" marking stamp is designed to indicate certain information including, for example, the IFS Certified Applicators name, alpha-numeric tagging number, and date of treatment and test method the item meets is applied to treated items, etc. This stamp can be visible with the use of an ultra-violet light source (e.g., 360 nm long-wave Ultra-Violet Fluorescent Light Tube). The agent is developed to maintain its reflective capabilities under normal ambient conditions. The agent's formulation can contain a viscosity reducing agent of Propanetriol, a water miscible organic glyceride to provide for minimum wicking of agent when applied to open and closed weave natural and synthetic fibers.

The agent/stamp formulation can be designed to lose its fluorescent properties on treated textiles when subjected to laundering, and can act as an indicator that the items need to be retreated. To accomplish this, the formulation can contain a Kosher Triol, an Aliphatic Alcohol containing a nonaromatic fragmented hydrocarbon agent that releases the YFP fluorophore fluorescent tracing compound from the textile fibers when the treated textiles have been subjected to water based laundering systems. In this case, the Ultra-Violet reflecting capabilities of tracing compound should preferably be no longer be discernible with the use of 350-360 nm Long-wave Ultra-Violet light tube after laundering, and provides for indication that the flame retardant properties of the textiles treated with a certain flame retardant has been compromised and reapplication may be necessary.

In accordance with an alternative embodiment of the present invention, a tagging and tracking system is provided that includes one or more of the following: a tracing and tagging agent for lumber and polyurethane substrates both unfinished and previously finished surfaces treated with a flame retardant coating (paints, varnishes etc.), the agent comprising a clear ultraviolet reactive acrylic pigment. This agent is formulated to incorporate the same reflective qualities with the use of a 350-360 nm long-wave Ultra-Violet Light Tube as described with respect to the agent used with textiles (above), with the exception that it is preferable that this formulation be a permanent marking compound.

Use of this type of tracing/tagging method allows for tracking and monitoring of treated items without the possibility of standard used tags falling off or being removed and gives notice to when retreatment is necessary.

Data/information regarding items treated with these agents can be entered into a secured certificate generating software database program, which can be structured, configured, and/or programmed to accept the input of this data, validate this data, and issue a certificate of fire resistance indicating that an applicator of these agents applied the agents properly for purposes of compliance with applicable local, state, federal, and/or other laws, codes, regulations, or other requirements. Further, the secured certificate generating software program can be structured, configured, and/or programmed to monitor the application of the flame retardant materials and the tagging and tracing agent.

The details of one or more embodiments are described below and in the accompanying drawings. Other objects and advantages of the present invention will in part be obvious, and in part appear hereinafter.

BRIEF DESCRIPTION OF THE DRAWINGS

The present invention will be more fully understood and appreciated by reading the following Detailed Description in conjunction with the accompanying drawings, in which:

FIG. 6 is a sample data entry screen, according to an embodiment of the present invention.

FIG. 7 is a sample data entry screen, according to an embodiment of the present invention.

FIG. 9 is a sample data entry screen, according to an embodiment of the present invention.

DETAILED DESCRIPTION

Figure 1:
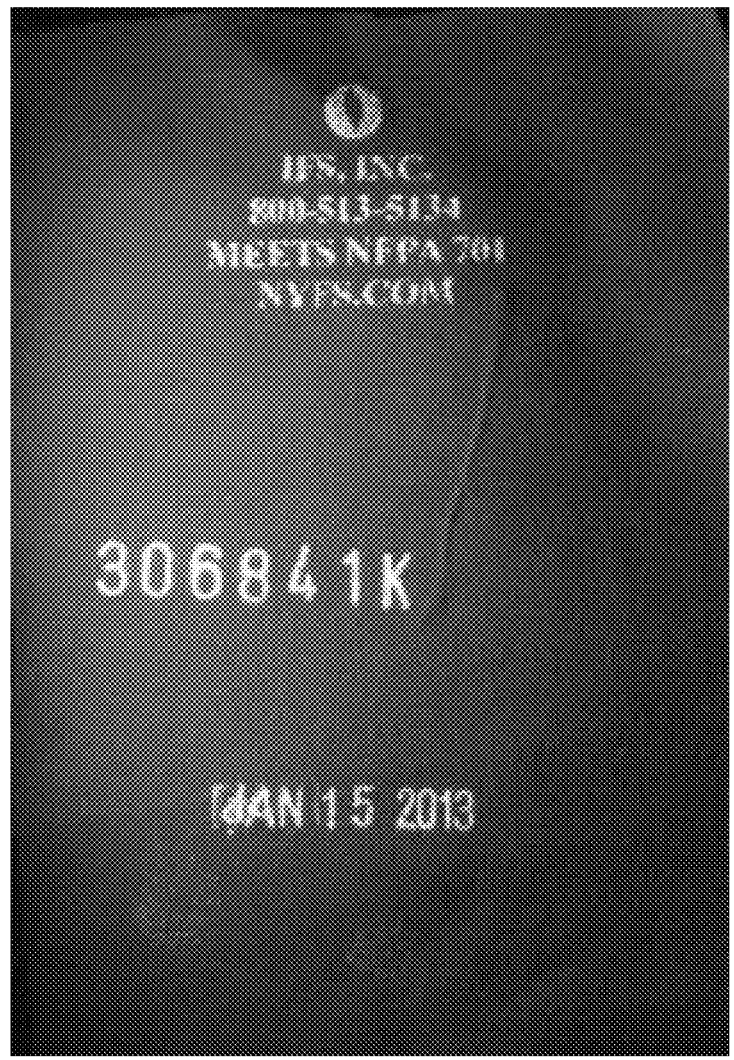
FIG. 1 is a photograph of a textile substrate stamped with a tracing and tagging agent of an embodiment of the present invention and shown under ultraviolet light.

The present invention will be more fully understood and appreciated by reading the following Detailed Description in conjunction with the accompanying drawings, wherein like reference numerals refer to like components.

Advantages of the invention are illustrated by the Example section below. However, the particular materials and amounts thereof recited in these examples, as well as other conditions and details, are to be interpreted to apply broadly in the art and should not be construed to unduly restrict or limit the invention in any way.

EXAMPLE

Tracing and Tagging Agent Formulation Ratio and Ultra-Violet Reflection Tests

This Example describes the use of the tagging and tracing agent on a textile sample, in accordance with an embodiment of the present invention. Sample swatches of natural, synthetic and blends of fabrics of various ounce weights and colors were first treated with a certain fire retardant. The wet samples were then stamped with the tagging and tracing agent of an embodiment of the present invention formulated with various ratios of the YFP fluorophore (suspended in Dihydrogen Monoxide), Propanetriol and Kosher Triol to determine the reflective capabilities of each formulation.

Multiple combinations of the (YFP), Dihydrogen Monoxide, Propanetriol, and the Kosher Triol were applied to textiles to achieve the best fluorescent properties, minimal wicking into the fibers for alpha numeric legibility under ultra violet light conditions and release of the agent from the fibers when subjected to washing. A preferred embodiment ratio is 1 part (YFP), 4 parts Dihydrogen Monoxide, 1.5 parts Propanetriol and 1.5 parts Kosher Triol.

A felt ink pad is saturated with the tracing and tagging agent and a rubber stamp were used to transfer the agent to the textiles by hand application after the items have been treated with the fire retardant. The use of the Propanetriol in the formulation allows for the agent to be applied to the textile prior to drying from treatment with the flame retardant. The same process is used for the stamping of the lumber substrates.

The samples were then allowed to dry to a moisture content of 12% or less.

The dried samples were then laundered with over the counter detergent in a standard residential washer at temperatures of 50° F., 80° F. and 100° F. Samples were then dried in a standard electric residential dryer at temperatures of 80° F. and 120° F.

The textile stamped items with the preferred formulation of the tracking agent were viewed under various ultra-violet light sources before washing. The textile stamped items were also viewed under various ultra-violet light sources after washing to determine the amount of residual fluorescence from the tagging and tracing agent still visible from the formulation ratios, washing temperatures and drying temperatures. The wavelengths from these light sources ranged from 350 nm to 517 nm. The 350 nm to 360 nm wavelength ultra violet light source was found to be the best for reflection of the tagging and tracing agent formulation.

As shown in some of the figures described below, after the fire retardant treated textiles were washed, the tagging and tracing agent stamp was no longer discernible (or at most minimally discernible) under the ultra violet light source. These items were then tested for flame retardancy and found to have lost their flame retardant properties indicating the need for reapplication of the flame retardant.

Figure 2:
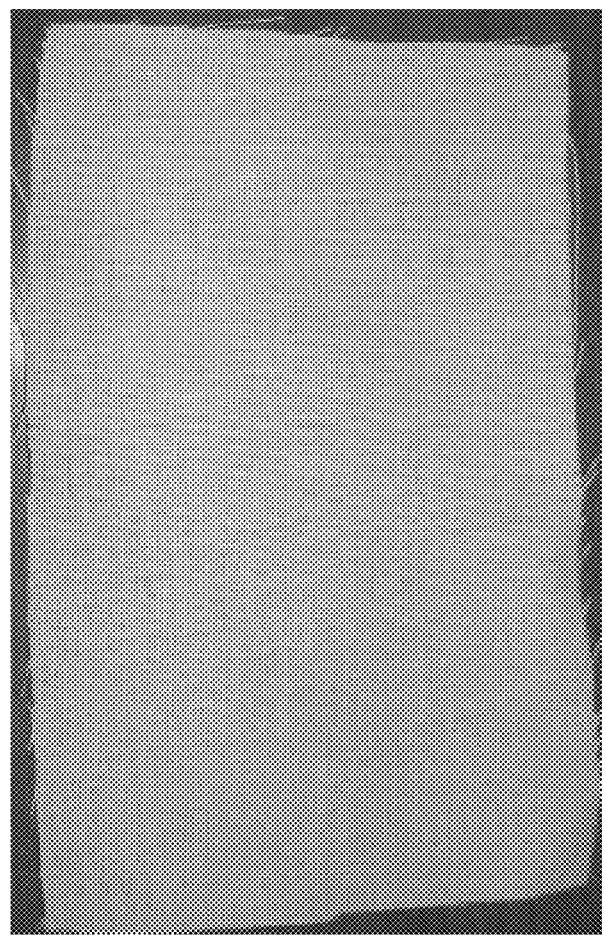
FIG. 2 is a photograph of the textile substrate stamped with a tracing and tagging agent of FIG. 1 and shown under ambient light conditions.
Figure 3:
FIG. 3 is a photograph of a textile substrate stamped with a tracing and tagging agent of FIG. 1 and shown under ultraviolet light after washing.

FIGS. 1-3 are photographs showing the results of the use of a tracing and tagging agent of an embodiment of the present invention on a textile substrate under ultraviolet light conditions, under ambient light conditions, and under ultraviolet light conditions after washing, respectively.

In accordance with an embodiment of the present invention, a preferable formulation for the permanent marking compound that may be used on a lumber substrate is 1 part (YFP), 4 parts Dihydrogen Monoxide and 3 parts of a synthetic vinyl polymer, which is substituted for the Propanetriol and Kosher Triol components referenced above. The vinyl polymer can provide for provide for washability, water resistance, and adhesion to the fire retardant treated lumber and polyurethane. This formulation can be referenced as the clear ultraviolet reactive pigment.

Figure 4:
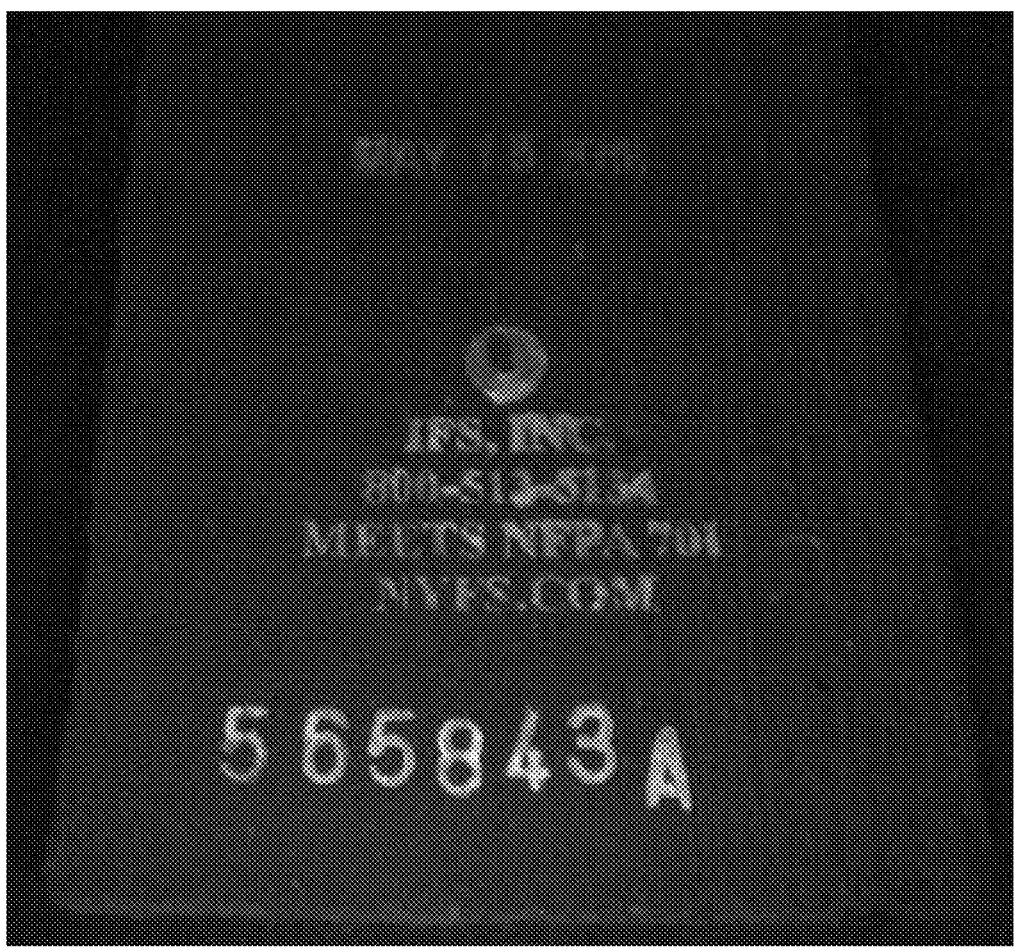
FIG. 4 is a photograph of a lumber substrate treated with flame retardant paint and stamped with a tracing and tagging agent of an embodiment of the present invention and shown under ultraviolet light.
Figure 5:
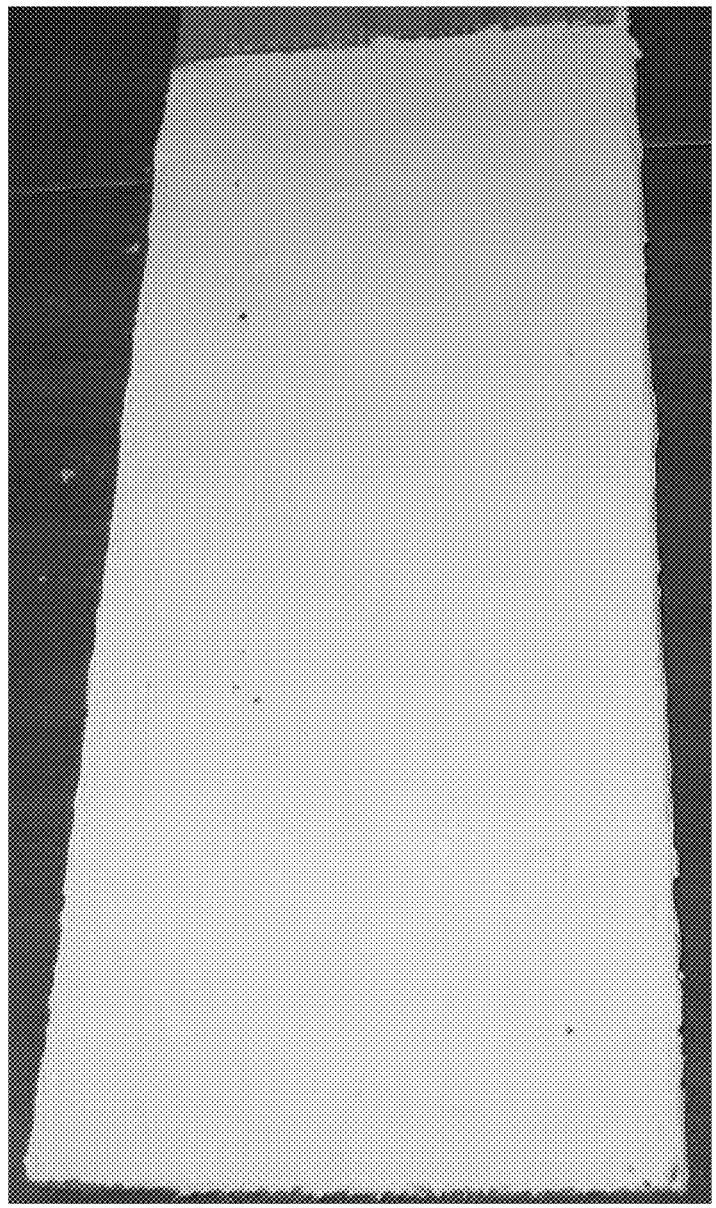
FIG. 5 is a photograph of a lumber substrate treated with flame retardant paint and stamped with a tracing and tagging agent of FIG. 4 and shown under ambient light conditions.

FIGS. 4-5 are photographs showing the results of the use of a tracing and tagging agent of an embodiment of the present invention on a lumber substrate treated with flame retardant paint under ultraviolet light conditions and under ambient light conditions, respectively.

FIG. 4 is a photograph of a lumber substrate treated with flame retardant paint and stamped with a tracing and tagging agent of an embodiment of the present invention and shown under ultraviolet light.

FIG. 5 is a photograph of a lumber substrate treated with flame retardant paint and stamped with a tracing and tagging agent of FIG. 4 and shown under ambient light conditions.

Secured Certificate Generating Software Program

In accordance with an embodiment of the present invention, users of a tagging and tracing agent of an embodiment of the present invention can be required to apply for a certificate of fire resistance prior to being provided with the ability to apply a particular tagging and tracing agent to a particular substrate. The application process can require the input of certain data/information into a database program consisting of multiple information tables and a user interface containing entry fields that match the information requested on an application, for example. A sample data entry screen is shown in FIG. 6.

Information/data that can be required includes one or more of the following (in addition to any additional information/data requested as shown in certain Figures described herein): name, address, phone etc. of person/entity to receive certification, total square feet to be treated, type and description of materials treated (color, composition, etc.), location of treatment (i.e., building, room #, etc.), amount of tagging and tracing agent used, batch date code, name, address, phone etc. of applicating person/entity, field testing data including have the items (textile, lumber) been field tested and did the item pass the field test, does the local fire marshal or insurance adjustor have specific test requirements (e.g., ASTM-E-84 (Steiner Tunnel), NFPA-701, FAA-(FAR 25.853 paragraph b). The field test for a textile substrate can include holding the bottom of a sample of the fire retardant treated textile substrate into a flame (e.g., 1.5 inch butane lighter flame) for a period of about 12 seconds, and it is preferable that no combustion of material may be noted in order to pass the field test. The field test for a lumber substrate can include holding a flame (e.g., a propane or butane flame) to a portion of a fire retardant treated lumber substrate for a period of about 15 seconds, and upon removal the tested area must self-extinguish within 5 seconds.

Figure 7:
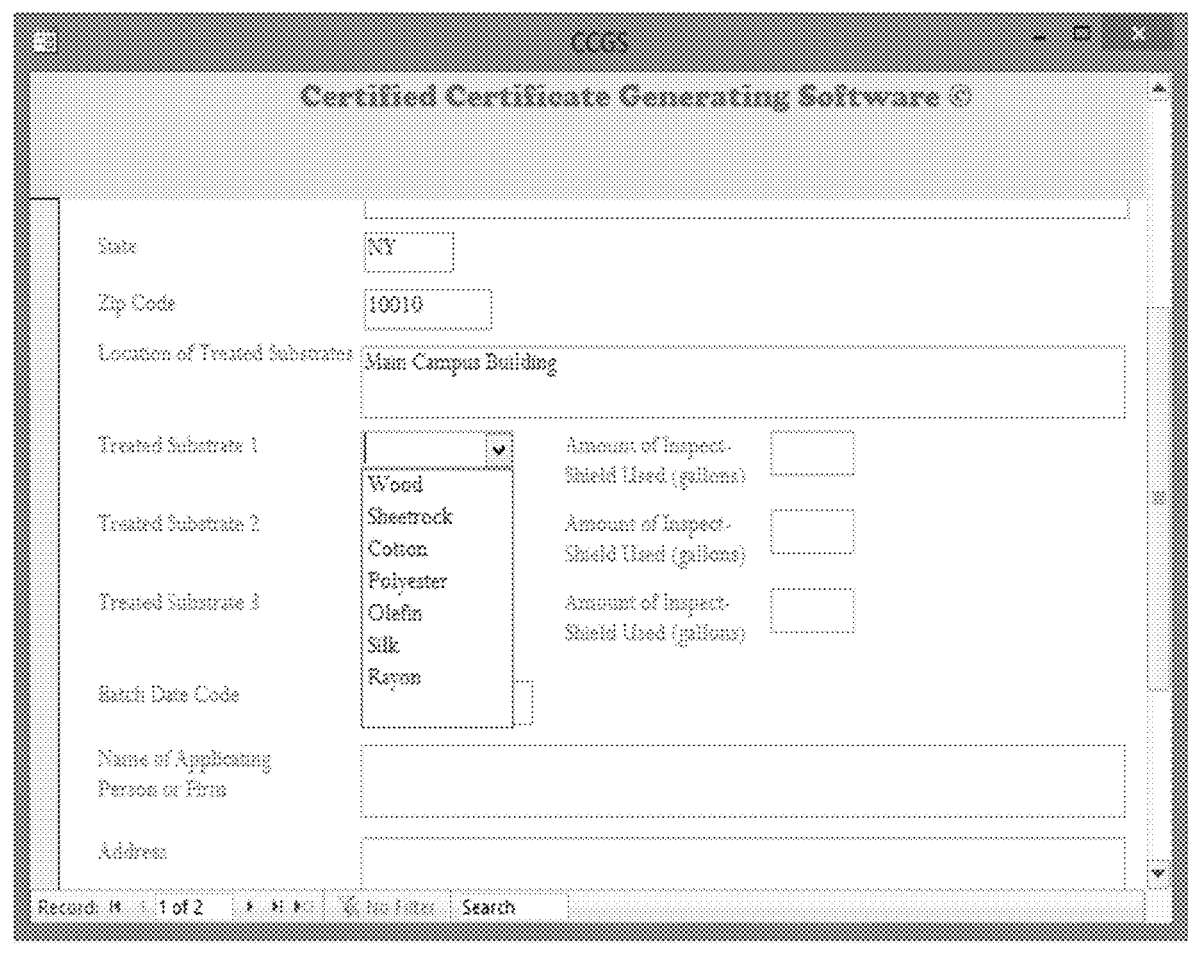

Program code of the database program can apply validation rules to certain specific fields which, if not passed, can automatically reject the application. The program can have a real-time link to the current list of certified applicants to enable instant verification. Additionally, the program can contain a table listing all tagging and tracing agents and treatable substances/substrates with product applicability to ensure the right product is used on the right substrate, and application rates per-gallon per square foot to ensure the correct amount of the indicated product(s) was/is used. A sample data entry screen showing treatable substances is shown in FIG. 7.

The application fields and validation rules within the program code can include one or more of the following:

| Application Information | Validation test | Pass/Fail |
| --- | --- | --- |
| 1) Certified applicator certification number | Applicator certification number and signature match records. | Pass. |
| | Applicator certification number and/or signature do not match records. | Reject. |
| 2) Certified applicator certification date | Applicator certification date is valid and matches records. | Pass. |
| | Applicator certification date not valid and/or does not match records. | Reject. |
| 3) Proof of Product Purchase | Proof of purchase presented and product 24 months old or less. | Pass. |
| | Proof of purchase not presented or product older than 24 months. | Reject. |
| 4) Product Used/Number of Gallons Used/Batch Number | Matches substrate application rates. | Pass. |
| | Does not match substrate application rates. | Reject. |
| 5) Substrate treated/square footage | Matches substrate application rates. | Pass. |
| | Does not match substrate application rates. | Reject. |
| 6) Length of certificate | Certificate length matches product. | Pass. |
| | Certificate length does not match product. | Reject. |
| 7) Location of Project | Matches certified location. | Pass. |
| | Does not match certified location. | Reject. |

Figure 8:
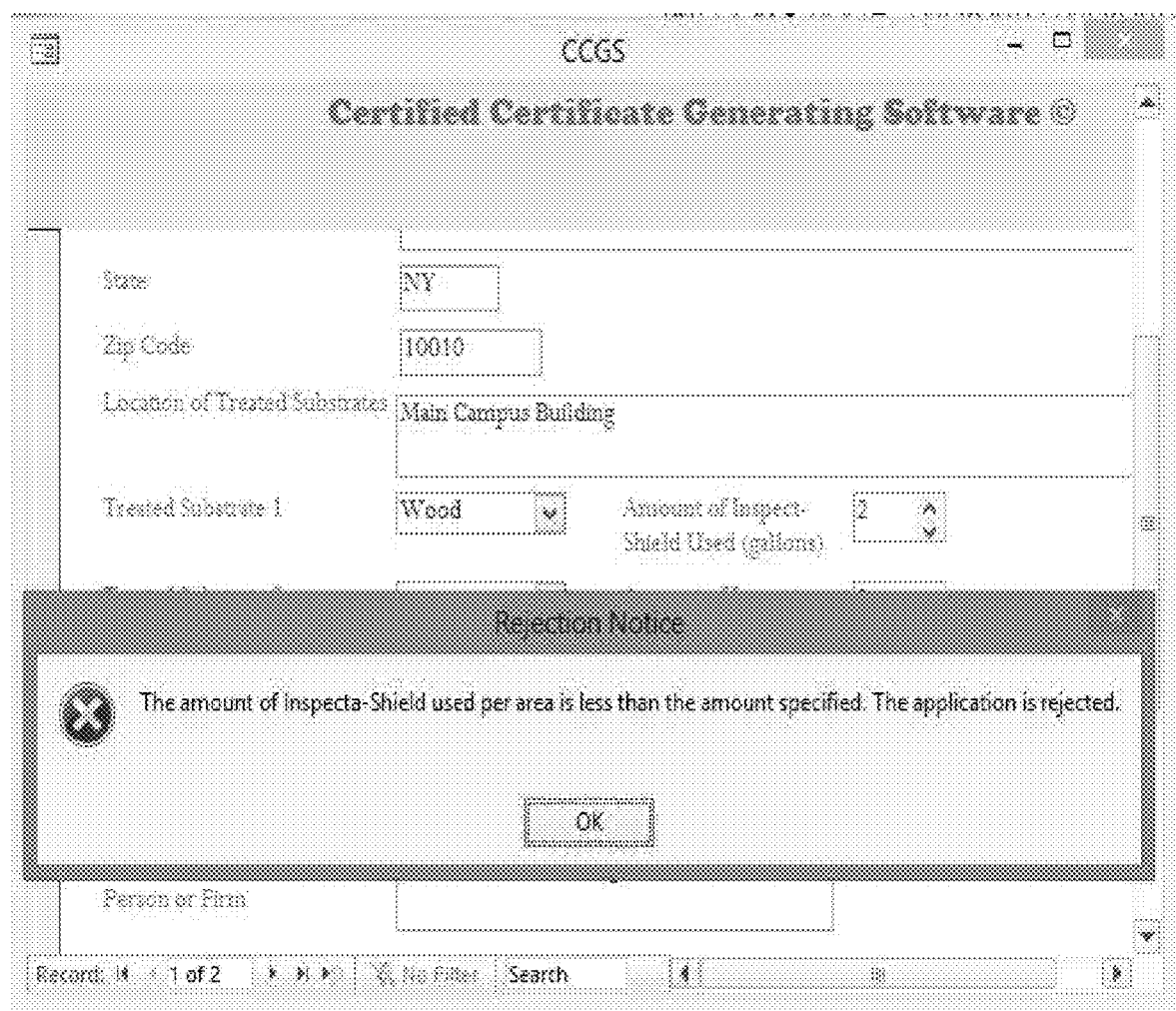
FIG. 8 is a sample data entry screen, according to an embodiment of the present invention.
Figure 9:
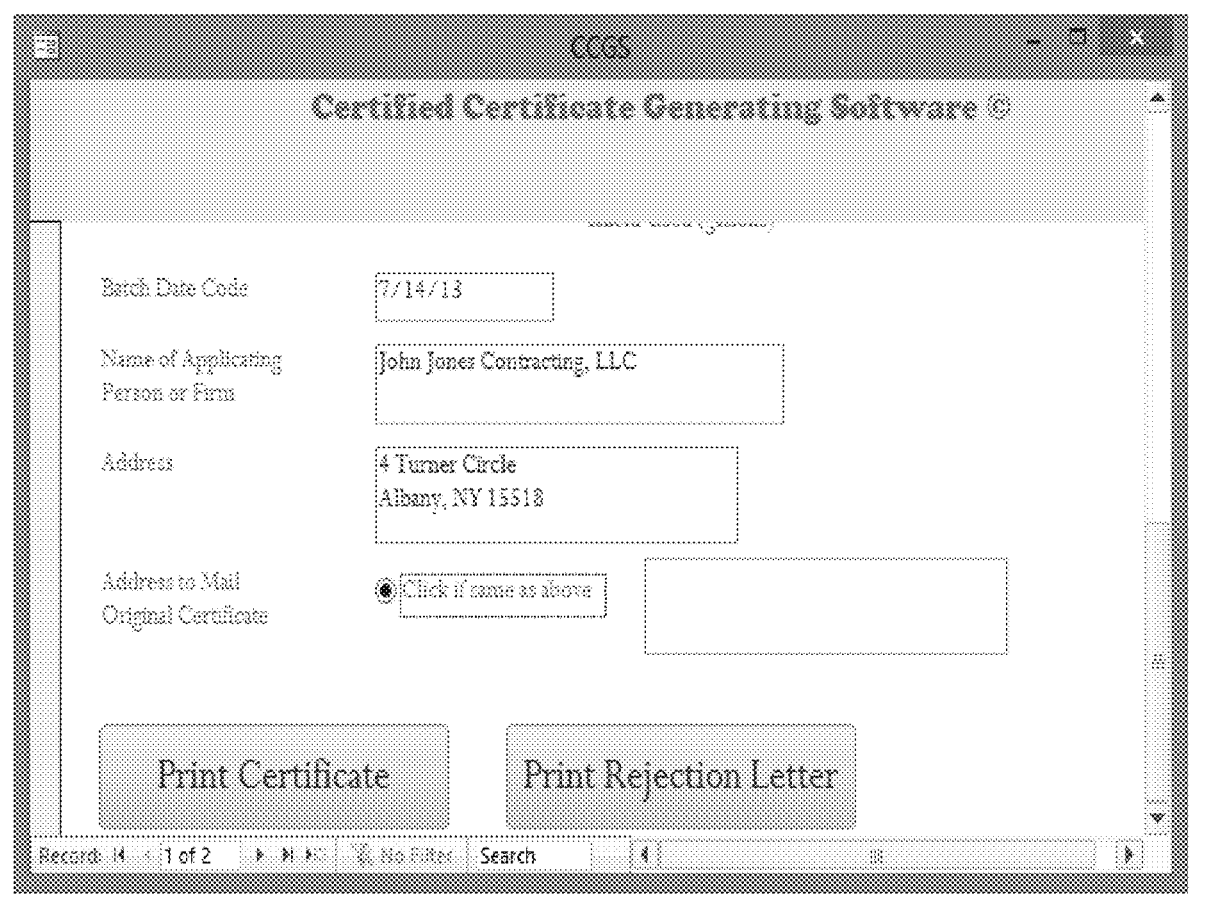

Preferably, if all validation criteria match, a certificate of fire resistance is printed and issued, or generated and electronically mailed. If any validation criteria do not match (or if validation criteria deemed most important do not match), a letter/electronic mail/message of rejection can be printed/generated and issued which can also specify the reason for rejection. A sample data entry screen showing a rejection message is shown in FIG. 8. A sample data entry screen showing print buttons for a certificate or a rejection letter is shown in FIG. 9.

A certificate of fire resistance can issue for a specific time frame. For example, a 5 year certificate can issue. The program can be structured, configured, and/or programmed to generate and send a renewal notice to the client certificate holder (e.g., at the 4½ year mark) information on current applicable products and rates. In instances where permanent certificates are issued, the program can generate and send a notice on the 5 or 10-year anniversary date, for example, reminding the client certificate holder to use fire-resistant products if they do any refinishing work. Again, information can be included with current applicable products and rates.

The program can also have the ability to search and produce reports based on multiple criteria.

As will be appreciated by one skilled in the art, aspects of the present invention including the embodiments of the secured certificate generating software program described herein may be embodied/implemented as a computer system, method or computer program product. The computer program product can have a computer processor or neural network, for example, which carries out the instructions of a computer program. Accordingly, aspects of the present invention may take the form of an entirely hardware embodiment, an entirely software embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction performance system, apparatus, or device.

The program code may perform entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

While several embodiments of the invention have been discussed, it will be appreciated by those skilled in the art that various modifications and variations of the present invention are possible. Such modifications do not depart from the spirit and scope of the present invention.

What is claimed is:

1. A tagging and tracking system for a flame retardant treated textile substrate having at least a first surface with at least partially coated or stamped with a tagging and tracing agent composition, wherein the composition comprising an aqueous fluorescent compound comprising a (YFP) yellow organic protein fluorophore suspended in dihydrogen monoxide, and wherein the agent is formulated to only be visible under an ultra-violet light source with electromagnetic wavelengths between 350 nm and 400 nm, the system comprising:
   a processor configured to:
   receive and store treated textile substrate information in database, wherein the treated textile substrate information includes an amount used, identity and date of application of the tagging and tracing agent composition and at least one of the following:
      type, description and location of the treated textile substrate; amount used, identity and date of application of the flame retardant composition; personal identification information of tagging and tracing agent composition applicator; and field testing data results;
   analyze the treated textile substrate information;
   apply one or more validation rules to the treated textile substrate information; and
   generate and communicate a pass notification to a user if one or more of the one or more validation rules are met.

2. The system of claim 1, wherein the one or more validation rules comprise at least one of acceptable amounts of tagging agent composition based on size and type of the treated textile substrate; acceptable identity of tagging agent based on the type and description of the treated textile substrate; and acceptable independent third party quality control testing of the flame retardant composition.

3. The system of claim 1, wherein the pass notification comprises a certificate of fire resistance for a first period of time.

4. The system of claim 3, wherein the processor generates a fire retardant tagging and tracing agent composition application renewal notice to the user prior to the end of the first period of time.

5. A tagging and tracking system for a flame retardant treated textile substrate having at least a first surface with at least partially coated or stamped with a tagging and tracing agent composition, wherein the composition comprising an aqueous fluorescent compound comprising a (YFP) yellow organic protein fluorophore suspended in dihydrogen monoxide, wherein the agent is formulated to only be visible under an ultra-violet light source with electromagnetic wavelengths between 350 rim and 400 nm, and wherein the tagging and tracing agent coating or stamp forms indicates an alpha-numeric identification number (ID) tagging and tracking number of the treated textile substrate when viewed under the ultra-violet light source, the system comprising:
   a processor database configured to:
   receive and store treated textile substrate information in database;
   associate the alpha-numeric ID tagging and tracking number to the treated textile substrate:
   wherein the treated textile substrate information comprising an amount used, identity and date of application of the tagging and tracing agent composition and at least one of the following:
      type, description and location of the treated textile substrate;
      amount used, identity and date of application of the flame retardant composition;
      personal identification information of tagging and tracing agent composition applicator; field testing data results; and
      flammability code or a flame retardant requirement met by the flame retardant treatment;
   receive the alpha-numeric ID tagging and tracking number of the treated textile substrate; and
   generate and communicate a notification providing a user to the treated textile substrate information associated with the ID number.

* * * * *